United States Patent [19]

Paasivaara et al.

[11] Patent Number: 5,379,641
[45] Date of Patent: Jan. 10, 1995

[54] METHOD FOR MEASURING THE DEFLECTION IN THE SHAFT OF A GOLF CLUB FOR CONTROLLING THE DYNAMIC LOFT ANGLE OF A CLUB

[75] Inventors: Jukka Paasivaara, Paris, France; Matti Suominen, Vantaa; Pekka Tiikkainen, Mäntyharju, both of Finland

[73] Assignee: Exel Oy, Finland

[21] Appl. No.: 73,347

[22] Filed: Jun. 7, 1993

[30] Foreign Application Priority Data

May 4, 1993 [FI] Finland .................. 932001

[51] Int. Cl.6 .............................. G01H 9/00
[52] U.S. Cl. .............................. 73/579; 73/849; 273/77 A
[58] Field of Search ............. 73/849, 579; 273/77 A

[56] References Cited

U.S. PATENT DOCUMENTS

| | | | |
|---|---|---|---|
| 3,395,571 | 8/1968 | Murdoch . | |
| 3,871,649 | 3/1975 | Kilshaw | 273/77 A |
| 4,070,022 | 1/1978 | Braly | 273/77 |
| 4,122,593 | 10/1978 | Braley | 29/407 |
| 4,261,566 | 4/1981 | MacDougall | 273/77 A |
| 4,319,750 | 3/1982 | Roy | 273/80 B |
| 4,563,007 | 1/1986 | Bayliss et al. | 273/77 A |
| 4,682,504 | 7/1987 | Kobayashi | 73/854 |
| 4,736,093 | 4/1988 | Braly | 235/88 G |
| 4,900,025 | 2/1990 | Suganuma | 273/77 A |
| 5,040,279 | 8/1991 | Braly | 29/407 |
| 5,093,162 | 3/1992 | Fenton et al. | 428/34.5 |
| 5,163,681 | 11/1992 | Hodgetts | 273/77 A |
| 5,265,872 | 11/1993 | Tennent et al. | 273/80 B |

Primary Examiner—Hezron E. Williams
Assistant Examiner—James M. Olsen
Attorney, Agent, or Firm—Lalos & Keegan

[57] ABSTRACT

The invention relates to a method for measuring the deflection in a golf club shaft (3) for controlling the dynamic loft angle of a shaft. The method comprises the steps of fixedly clamping a shaft (3) at a certain distance from a club head (5), setting club head (5) in vibration, and measuring the vibration frequency while shaft (3) is clamped at the clamping distance. This is followed by releasing the shaft (3) from clamping and by repeating the above actions at varying distances from the club head (5) and by using the thus obtained measuring results for setting up a frequency profile for shaft (3).

4 Claims, 1 Drawing Sheet

METHOD FOR MEASURING THE DEFLECTION IN THE SHAFT OF A GOLF CLUB FOR CONTROLLING THE DYNAMIC LOFT ANGLE OF A CLUB

BACKGROUND OF THE INVENTION

The present invention relates to a method for measuring the deflection in the shaft of a golf club for controlling the dynamic loft angle of a club.

It has been found that the behavior of two traditionally identical shafts in an identical swing situation is different. Thus, even if the loft angle of a club were made physically indistinguishable, the different physical behavior of the shafts causes a change in the dynamic (effective) loft angle of a club. An object of the present invention is to provide a method for measuring the dynamic behavior of a shaft. The behavior characteristics are then used for selecting an optimal process of manufacturing the shaft to effect the dynamic loft angle of the club.

SUMMARY OF THE INVENTION

In order to achieve the above object, the method of the present invention includes clamping a shaft in a fixed position at a certain distance from the head of a club, setting the head in vibration, measuring the vibration frequency while the shaft is clamped at the clamping distance, releasing the shaft from the clamp, repeating these steps at varying distances from the head of a club, and using the obtained measuring results to set up a frequency profile for the shaft in question.

One of the benefits offered by the method of the present invention is the possibility of systematically determining a frequency profile for the shaft of a club, which in turn assists in optimizing the parameters relating to a particular manufacturing method, such as the direction, number, and thickness of coiling fibers or laminate layers.

Traditionally, the total stiffness of a shaft is measured by means of two mutually correlating approaches, i.e., by bending a shaft on a flex board (e.g. "Japanese deflection") or by measuring the frequency of a shaft by using the method developed by Brunswick. A frequency profile of the invention does not relate to this total shaft stiffness or degree of deflection but, instead addresses how the bonding or deflection takes place. In other words, "the stiffness" of a shaft is measured at a number of points along the axis of a shaft for producing a curve that represents the deflection of the shaft.

BRIEF DESCRIPTION OF THE DRAWINGS

The invention will now be described in more detail with reference made to the accompanying drawings, in which.

DESCRIPTION OF THE PREFERRED EMBODIMENTS

Figure 1:
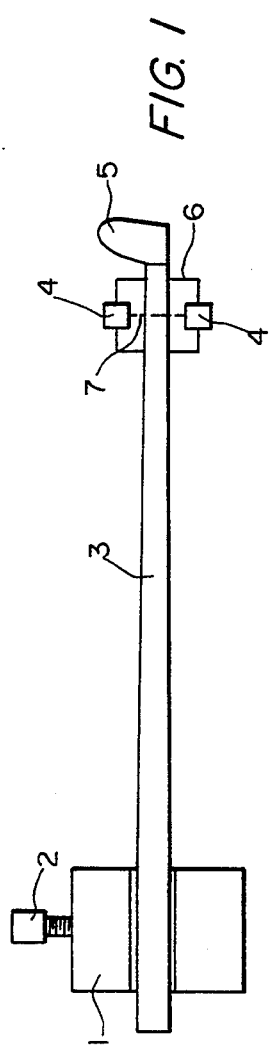
FIG. 1 is a schematic plan view of an apparatus for carrying out a method of the present invention.

As shown in FIG. 1, the measuring apparatus of the present invention includes a clamping device 1 for fixing a club shaft 3 firmly at a desired point, for example by means of a tightening member 2. The apparatus further includes frequency reading elements 4, mounted adjacent to a club head 5. Reading elements 4 may comprise, for example, a light ray emitting and reading device mounted on either side of a movable stand 6 opposing one another so that the shaft is received therebetween. When the shaft is placed in vibrating or oscillating motion, the shaft interferes with a light ray 7 arriving in the reading device, thereby permitting the vibration frequency to be measured. In order to produce comparable results, the club head 5 is of a standard weight.

A frequency profile for a shaft is produced by setting a club in vibration. For example, referring to FIG. 1, the club is set in motion in the direction perpendicular to the plane of paper. The club can be set in vibration manually, i.e., by physically pressing the head in the desired direction, or by using an appropriate mechanical device. As the shaft is in vibrating or oscillating motion, the reading elements 4 measure the vibration frequency.

Figure 2:
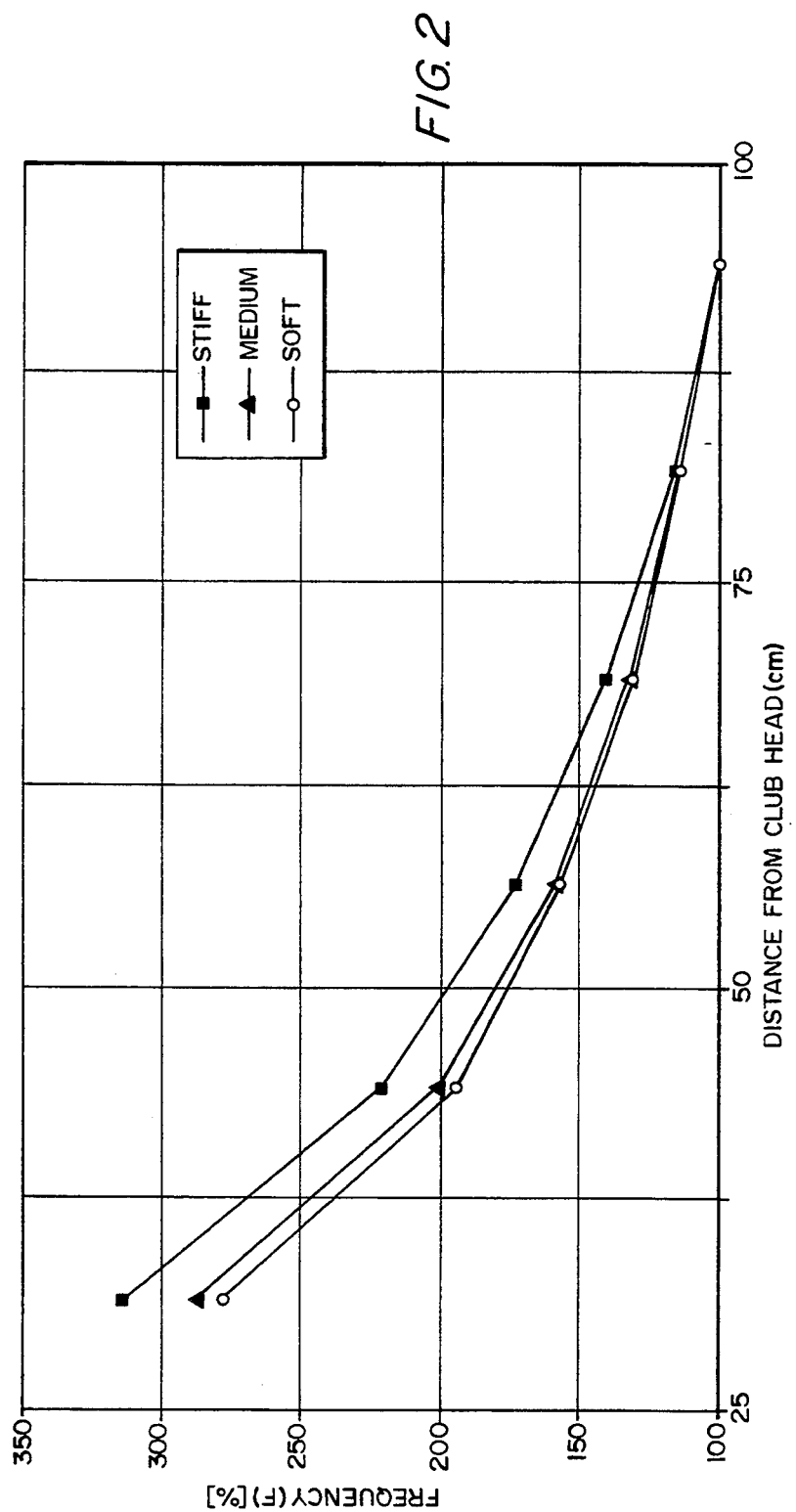
FIG. 2 shows an exemplary measuring result for the vibration frequency of a shaft as a function of the point of clamping.

These steps are repeated by securing clamping device 1 at various clamping points located along shaft 3. After vibration frequency measurements are collected at the various clamping points, the vibration profiles are then produced. An example of a resulting vibration profile is shown in FIG. 2, wherein the y-axis represents relative frequency and the x-axis represents the distance of a clamping point from club head 5.

A measuring method of the invention can also be practiced by producing a set of clubs having an identical physical loft angle, each club of said set having a different dynamic loft angle.

We claim:

1. A method for measuring the deflection in the shaft (3) of a golf club for controlling the dynamic loft angle of a club, the method comprising:
  (a) fixedly clamping the shaft (3) at a certain distance from a club head (5),
  (b) setting the club head (5) in vibration,
  (c) measuring the vibration frequency while the shaft (3) is clamped at the clamping distance,
  (d) releasing the shaft (3) from clamping,
  (e) repeating steps (a) through (d) at varying distances from club head (5), and
  (f) setting up a frequency profile for shaft (3) using the obtained measurements.

2. A method as set forth in claim 1, wherein the step of setting the club head in vibration comprises manually forcing the club head down or up and releasing the club head.

3. A method as set forth in claim 1 or 2, wherein each shaft (3) to be measured is provided with a standard weight club head (5).

4. A method as set forth in claim 1, wherein the method for determining the dynamic behavior of a shaft by measuring the deflection of a shaft by means of the frequency profile is used in the process of manufacturing a shaft.

* * * * *